United States Patent
Laffargue et al.

(10) Patent No.: US 9,826,220 B2
(45) Date of Patent: Nov. 21, 2017

(54) DIMENSIONING SYSTEM WITH FEEDBACK

(71) Applicant: Hand Held Products, Inc., Fort Mill, SC (US)

(72) Inventors: Franck Laffargue, Toulouse (FR); Jeffrey Hunt, Kirkland, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/581,572

(22) Filed: Apr. 28, 2017

(65) Prior Publication Data

US 2017/0230639 A1    Aug. 10, 2017

Related U.S. Application Data

(63) Continuation of application No. 14/519,195, filed on Oct. 21, 2014, now Pat. No. 9,677,872.

(51) Int. Cl.
| | |
|---|---|
| *G01B 11/02* | (2006.01) |
| *G06T 17/20* | (2006.01) |
| *G06K 9/03* | (2006.01) |
| *G06T 7/60* | (2017.01) |
| *H04N 13/02* | (2006.01) |
| *G01B 11/25* | (2006.01) |

(52) U.S. Cl.
CPC ....... *H04N 13/0271* (2013.01); *G01B 11/024* (2013.01); *G01B 11/25* (2013.01); *G06K 9/036* (2013.01); *G06T 17/20* (2013.01); *H04N 13/0257* (2013.01)

(58) Field of Classification Search
CPC ....... G01B 11/024; G06T 17/20; G06T 7/602; G06K 9/036; H04N 13/0271

USPC ................................... 235/472.01
See application file for complete search history.

(56) References Cited

U.S. PATENT DOCUMENTS

| | | | |
|---|---|---|---|
| 4,279,328 | A | 7/1981 | Ahlbom |
| 5,184,733 | A | 2/1993 | Amarson et al. |
| 5,561,526 | A | 10/1996 | Huber et al. |
| 5,767,962 | A | 6/1998 | Suzuki et al. |
| 5,938,710 | A | 8/1999 | Lanza et al. |
| 5,959,568 | A | 9/1999 | Woolley |
| 6,115,114 | A | 9/2000 | Berg et al. |

(Continued)

FOREIGN PATENT DOCUMENTS

| | | |
|---|---|---|
| CN | 201139117 Y | 10/2008 |
| EP | 2562715 A1 | 2/2013 |

(Continued)

OTHER PUBLICATIONS

U.S. Appl. No. 13/367,978, filed Feb. 7, 2012, (Feng et al.); now abandoned.

(Continued)

*Primary Examiner* — Toan Ly
(74) *Attorney, Agent, or Firm* — Additon, Higgins & Pendleton, P.A.

(57) ABSTRACT

A dimensioning system that analyzes a distance map for null-data pixels to provide feedback is disclosed. Null-data pixels correspond to missing range data and having too many in a distance map may lead to dimensioning errors. Providing feedback based on the number of null-data pixels helps a user understand and adapt to different dimensioning conditions, promotes accuracy, and facilitates handheld applications.

19 Claims, 4 Drawing Sheets

(56) References Cited

U.S. PATENT DOCUMENTS

| | | |
|---|---|---|
| 6,189,223 B1 | 2/2001 | Haug |
| 6,519,550 B1 | 2/2003 | D'Hooge et al. |
| 6,832,725 B2 | 12/2004 | Gardiner et al. |
| 6,922,632 B2 | 7/2005 | Foxlin |
| 7,057,632 B2 | 6/2006 | Yamawaki et al. |
| 7,128,266 B2 | 10/2006 | Zhu et al. |
| 7,159,783 B2 | 1/2007 | Walczyk et al. |
| 7,205,529 B2 | 4/2007 | Andersen et al. |
| 7,413,127 B2 | 8/2008 | Ehrhart et al. |
| 7,726,575 B2 | 6/2010 | Wang et al. |
| 8,072,581 B1 | 12/2011 | Breiholz |
| 8,294,969 B2 | 10/2012 | Plesko |
| 8,317,105 B2 | 11/2012 | Kotlarsky et al. |
| 8,322,622 B2 | 12/2012 | Liu |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1* | 8/2014 | Hilde .............. G06K 9/00214 356/3.01 |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |

(56) References Cited

U.S. PATENT DOCUMENTS

| | | |
|---|---|---|
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,082,195 B2 | 7/2015 | Holeva et al. |
| 9,142,035 B1 | 9/2015 | Rotman |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| 9,424,749 B1 | 8/2016 | Reed et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 9,486,921 B1 | 11/2016 | Straszheim et al. |
| 2002/0109835 A1 | 8/2002 | Goetz |
| 2002/0196534 A1 | 12/2002 | Lizotte et al. |
| 2003/0225712 A1 | 12/2003 | Cooper et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0291719 A1 | 12/2006 | Ikeda et al. |
| 2007/0003154 A1 | 1/2007 | Sun et al. |
| 2007/0063048 A1 | 3/2007 | Havens et al. |
| 2007/0143082 A1 | 6/2007 | Degnan |
| 2007/0177011 A1 | 8/2007 | Lewin et al. |
| 2008/0062164 A1 | 3/2008 | Bassi et al. |
| 2008/0079955 A1 | 4/2008 | Storm |
| 2008/0273210 A1 | 11/2008 | Hilde |
| 2009/0095047 A1 | 4/2009 | Patel et al. |
| 2009/0134221 A1 | 5/2009 | Zhu et al. |
| 2009/0318815 A1 | 12/2009 | Barnes et al. |
| 2010/0060604 A1 | 3/2010 | Zwart et al. |
| 2010/0113153 A1 | 5/2010 | Yen et al. |
| 2010/0118200 A1 | 5/2010 | Gelman et al. |
| 2010/0171740 A1 | 7/2010 | Andersen et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0223276 A1 | 9/2010 | Al-Shameri et al. |
| 2010/0321482 A1 | 12/2010 | Cleveland |
| 2011/0169999 A1 | 7/2011 | Grunow et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0303748 A1 | 12/2011 | Lemma et al. |
| 2012/0067955 A1 | 3/2012 | Rowe |
| 2012/0111946 A1 | 5/2012 | Golant |
| 2012/0126000 A1 | 5/2012 | Kunzig et al. |
| 2012/0168512 A1 | 7/2012 | Kotlarsky et al. |
| 2012/0190386 A1 | 7/2012 | Anderson |
| 2012/0193423 A1 | 8/2012 | Samek |
| 2012/0203647 A1 | 8/2012 | Smith |
| 2012/0223141 A1 | 9/2012 | Good et al. |
| 2012/0256901 A1 | 10/2012 | Bendall |
| 2013/0019278 A1 | 1/2013 | Sun et al. |
| 2013/0043312 A1 | 2/2013 | Van Horn |
| 2013/0075168 A1 | 3/2013 | Amundsen et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0211790 A1 | 8/2013 | Loveland et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |

(56) References Cited

U.S. PATENT DOCUMENTS

| | | |
|---|---|---|
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0329012 A1* | 12/2013 | Bartos ............... H04N 13/0246 348/46 |
| 2013/0329013 A1 | 12/2013 | Metois et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0009586 A1 | 1/2014 | McNamer et al. |
| 2014/0025584 A1 | 1/2014 | Liu et al. |
| 2014/0031665 A1 | 1/2014 | Pinto et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1* | 2/2014 | Laffargue ............ G01F 25/0084 348/135 |
| 2014/0058612 A1 | 2/2014 | Wong et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152882 A1 | 6/2014 | Samek et al. |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240464 A1 | 8/2014 | Lee |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009100 A1 | 1/2015 | Haneda et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |

(56) References Cited

U.S. PATENT DOCUMENTS

| | | |
|---|---|---|
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1 | 4/2015 | Vartiainen et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178900 A1 | 6/2015 | Kim et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0301181 A1 | 10/2015 | Herschbach |
| 2015/0325036 A1 | 11/2015 | Lee |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0048725 A1 | 2/2016 | Holz et al. |
| 2016/0057230 A1 | 2/2016 | Todeschini et al. |
| 2016/0090283 A1 | 3/2016 | Svensson et al. |
| 2016/0090284 A1 | 3/2016 | Svensson et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0187186 A1 | 6/2016 | Coleman et al. |
| 2016/0187210 A1 | 6/2016 | Coleman et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2017/0115490 A1 | 4/2017 | Hsieh et al. |
| 2010/7018294 | 6/2017 | Hardy et al. |

FOREIGN PATENT DOCUMENTS

| | | |
|---|---|---|
| GB | 2525053 A | 10/2015 |
| JP | 200696457 A | 4/2006 |
| JP | 2007084162 A | 4/2007 |
| JP | 2015174705 A | 10/2015 |
| KR | 20100020115 A | 2/2010 |
| WO | 2013163789 A1 | 11/2013 |
| WO | 2013173985 A1 | 11/2013 |
| WO | 2013184340 A1 | 12/2013 |
| WO | 2014019130 A1 | 2/2014 |
| WO | 2014110495 A1 | 7/2014 |

OTHER PUBLICATIONS

U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.);19 pages.
U.S. Appl. No. 29/468,118 for an Electronic Device Case, filed Sep. 26, 2013 (Oberpriller et al.); 44 pages.
U.S. Appl. No. 29/530,600 for CYCLONE filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch Fora Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.
Thorlabs, Examiner Cited NPL in Advisory Action dated Apr. 12, 2017 in releated commonly owned application, downloaded from https://www.thorlabs.com/newgrouppage9.cfm?objectgroup_id=6430, 4 pages.
EKSMA Optics, Examiner Cited NPL in Advisory Action dated Apr. 12, 2017 in related commonly owned application downloaded from http://eskmaoptics.com/optical-systems/f-theta-lens-for-1064-nm/, 2 pages.
Sill Optics, Examiner Cited NPL in Advisory Action dated Apr. 12, 2017 in related commonly owned application, http://www.silloptics.

(56) References Cited

OTHER PUBLICATIONS de/1/products/sill-encyclopedia/laser-optics/f-theta-lenses/, 4 pages.
Chinese Notice of Reexamination in related Chinese Application 201520810313.3, dated Mar. 14, 2017, English computer Translation provided, 7 pages [No new art cited].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on computer Vision Workshops, ICCV Workshops, 7 pages [Cited in EP Extended search report dated Apr. 10, 2017].
Ralph Grabowski, "Smothing 3D Mesh Objects," New Commands in AutoCAD 2010: Part 11, Examiner Cited art in related matter Non Final Office Action dated May 19, 2017; 6 pages.
European Exam Report in related EP Application No. 15176943.7, dated Apr. 12, 2017, 6 pages. [Art previously cited in this matter].
European Exam Report in related EP Application No. 15188440.0, dated Apr. 21, 2017, 4 pages. [No new art to cite].
European Exam Report in related EP Application No. 16152477.2, dated Jun. 20, 2017, 4 pages. [No art to be cited].
European Exam Report in related EP Applciation 16172995.9, dated Jul. 6, 2017, 9 pages. [No new art to be cited].
United Kingdom Search Report in related Application No. GB1700338.5, dated Jun. 30, 2017, 5 pages.
European Search Report in related EP Application No. 17175357.7, dated Aug. 17, 2017, pp. 1-7 [No new art to be cited].
EP Search Report in related EP Application No. 17171884 dated Sep. 18, 2017. 4 pages [Only new art cited herein].
EP Extended Search Report in related EP Application No. 17174843.7 dated Oct. 17, 2017. 5 pages (Only new art cited herein).
Boavida et al., "Dam monitoring using combined terrestrial imaging systems", 2009 Civil Engineering Survey Dec./Jan. 2009, pp. 33-38 {Cited in notice of Allowance dated Sep. 15, 2017 in related matter}.

\* cited by examiner

DIMENSIONING SYSTEM WITH FEEDBACK

CROSS-REFERENCE TO RELATED APPLICATION

The present application claims the benefit of U.S. patent application Ser. No. 14/519,195 for a Handheld Dimensioning System with Feedback filed Oct. 21, 2014 (and published Apr. 21, 2016 as U.S. Patent Publication No. 2016/0109220), now U.S. Pat. No. 9,638,512. Each of the foregoing patent application, patent publication, and patent is hereby incorporated by reference in its entirety.

FIELD OF THE INVENTION

The present invention relates to dimensioning systems, and in particular, to a dimensioning system that can provide feedback relating to the quality of data used for a dimension measurement.

BACKGROUND

Hands-free measurements of an object's dimensions (e.g., volume) may be carried out using a dimensioning system. Dimensioning systems can compute a package's volume to facilitate its storage, handling, transporting, and/or invoicing. Most transport vehicles have both volume and weight capacity limits, and an inefficient use of space results if the transport vehicle becomes full before its weight capacity is reached. By dimensioning packages, shipping companies can fill space optimally and compute shipping charges accurately. For this reason, dimensioning systems that accurately gather volume information, without causing disruptions in workflow, are highly desirable.

Handheld dimensioners require no dedicated setup to measure a dimension. These devices are small (e.g., fit into a user's hand) and convenient since the dimensioner is mobile. The handheld dimensioner can be positioned in a wide variety of environments. These environments may vary considerably because of lighting, object positioning, and/or object coloring. Some environments are not suitable for dimensioning; however, this is not always obvious to a user.

A need, therefore, exists for a handheld dimensioning system configured to (i) analyze the quality of the data used for dimensioning and (ii) provide feedback regarding this data, especially where dimensioning errors might otherwise result.

SUMMARY

Accordingly, in one aspect, the present invention embraces a method for obtaining a dimension measurement using a handheld dimensioner. The method includes the step of using a processor to receive range data from a dimensioning subsystem. From the range data, a processor creates a depth map. The depth map is analyzed, using the processor, to determine the depth map's null-data pixel count, wherein the null-data pixel count is the sum total of the null-data pixels. If the null-data pixel count is at or below a threshold count, then the processor computes a dimension measurement. Alternatively, if the null-data pixel-count is above the threshold count, then the processor generates an error feedback.

In an exemplary embodiment, the processor generates a confidence feedback if the depth-map's null-data pixel count is below the threshold count. An exemplary confidence feedback is a visible image of the handheld dimensioner's field-of-view including a wireframe rendering of an object. Another exemplary confidence feedback is a confidence value corresponding to the null-data pixel count. Yet another exemplary confidence feedback indicates that the dimension measurement conforms to a standard.

In another exemplary embodiment, the processor generates a user-guidance feedback if the null-data pixel count is above the threshold count. An exemplary user-guidance feedback is information to facilitate the adjustment of a measurement geometry. Another exemplary user-guidance feedback embodiment is information to facilitate the adjustment of lighting.

In another aspect, the present invention embraces a handheld dimensioning system configured to provide error feedback. The dimensioning system includes a dimensioning subsystem with at least one image sensor for capturing range data of an object or objects within a field-of-view. The dimensioning system also includes a control subsystem communicatively coupled to the at least one image sensor. The control subsystem includes at least one processor and at least one non-transitory storage medium for storing information and processor-executable instructions. The processor-executable instructions configure the processor to perform several functions. The processor is configured to receive range data from the dimensioning subsystem and to create a depth map from the range data. The processor is then configured to processes the depth map to obtain a depth-map quality. If the depth-map quality is below a minimum quality threshold, then the processor is configured to generate an error feedback.

In an exemplary embodiment, the depth-map quality includes a sum of the number of pixels in the depth map having insufficient information to determine depth.

In another exemplary embodiment, the handheld dimensioning system includes a pattern projector to project a light pattern onto the object or objects in the field-of-view.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a handheld dimensioning system (i.e., dimensioner) that provides feedback regarding the quality of the range data used for dimensioning. This qualitative feedback is especially important in handheld dimensioning.

Handheld dimensioning is a challenging problem. In handheld dimensioning applications, the measurement environment is uncontrolled, and the dimensioner must accommodate a wide range of measurement conditions. These measurement conditions include diverse lighting conditions, measurement geometries (e.g., spatial relationships and orientations), and/or object colors.

Handheld applications typically have a low tolerance for excessive measurement times and/or alignment complexities. A handheld dimensioner must employ robust sensing technologies with quality assurance feedback to achieve reliable measurements in adverse measurement conditions.

A variety of sensing technologies have been employed for dimensioning (e.g., time-of-flight sensing or stereoscopic imaging) to capture range data (i.e., depth data). One exemplary sensing technology, well suited for handheld dimensioners, uses structured light to capture range data. Structured-light dimensioners sense depth by projecting a known light pattern (e.g., dots, grids, bars, stripes, checkerboard, etc.) onto a scene (i.e., field-of-view). A pattern image is captured by an image sensor laterally offset from the projector. Distortions in the reflected light pattern caused by objects in the field-of-view are analyzed to derive depth (i.e., range) information.

A handheld-dimensioner's dimensioning subsystem may use structured light to sample spatially the range between the dimensioning system and an object (or objects) within the field-of-view. These samples combine to form a two dimensional (2D) array of range data. This range data is used to create a depth map.

Figure 1:
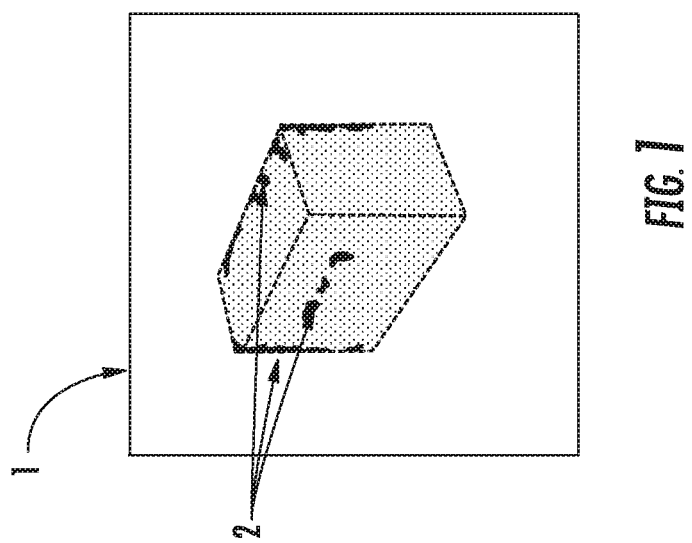
FIG. 1 depicts an image of an exemplary depth map.

A typical depth map is shown in FIG. 1. The depth map 1 is a two-dimensional digital image wherein the pixel values correspond to the sampled range. For the exemplary depth map in FIG. 1, close (i.e., short-range) pixels are lighter, while far (i.e., long range) pixels are darker.

Some pixels in the depth map 1 are black. These black pixels represent null-data pixels 2. Null-data pixels are points in the field-of-view that provided insufficient information to determine depth (i.e., range). Black null-data pixels are shown in the depth map 1; however, any pixel value could represent null-data pixels 2.

A variety of measurement conditions cause null-data pixels. One such condition is lighting. Suitable lighting is necessary to capture images of the light pattern used in structured-light dimensioners. Too little light may lead to noisy images, while excessive light may lead to saturated images. The lighting must also be uniform. Images with dark areas and saturated areas may have null-data pixels in both, since the dynamic range of the image sensor is often too small to capture both ideally.

Figure 2:
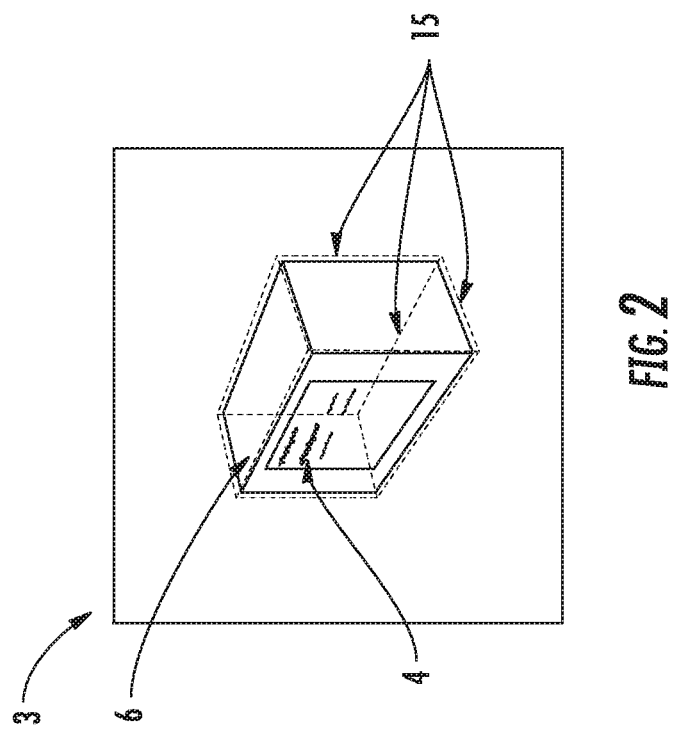
FIG. 2 depicts an exemplary feedback including a visible image of an object and a wireframe rendering of the object.

The depth map 1 in FIG. 1 has null-data pixels 2 along some edges and on the largest object surface shown. FIG. 2 shows visual feedback of the object. The feedback includes a visible image 3 of the object and shows that the source of the null-data pixels 2 is the darkly colored printing 4 on the side of the object. The printing 4 is reflects light poorly, leading to a low-light imaging condition. The light pattern (in this area) cannot be imaged to determine range. These pixels are assigned a zero value (i.e., null-data pixels). Object color can cause null-data pixels 2, and is a fact that may not be obvious without evaluating the depth map.

Figure 3:
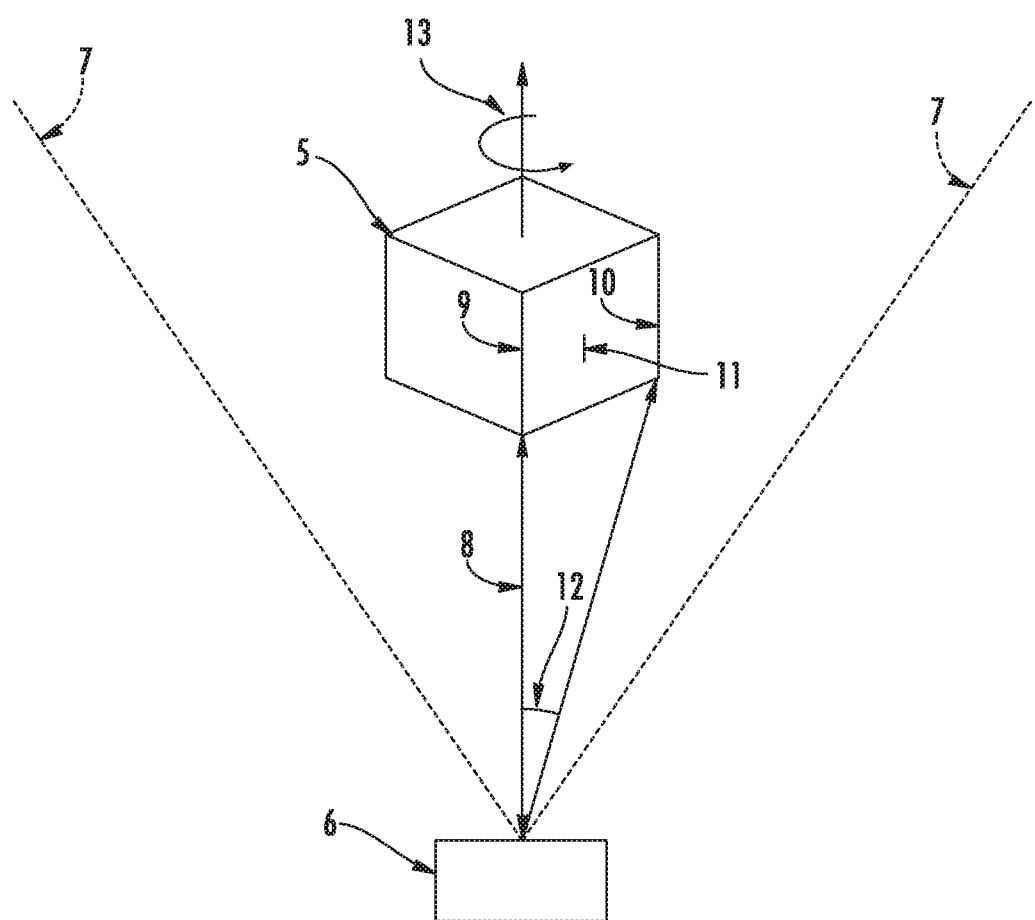
FIG. 3 schematically depicts an exemplary measurement geometry.

Certain measurement geometries can also lead to null-data pixels 2. Here measurement geometry refers to the measurement setup (e.g., spatial relationships and/or orientations). FIG. 3 depicts an exemplary measurement geometry. An object 5 for dimensioning is placed within a dimensioning system's 6 field-of-view 7. The object 5 is positioned at a range 8 (i.e., the distance between the dimensioning system and the object). Typically, three sides of the object are visible (to the dimensioner) for volume measurements. A surface 11 is visible when two of its edges 9,10 create an angle 12 (i.e., an angle with respect to the dimensioner's optical axis) that is greater than zero. Larger angles 12 imply more surface visibility. Feedback to facilitate the positioning of an object (or dimensioner) to maximize surface visibility is helpful in obtaining accurate dimensioning results.

When using a structured light dimensioner, an object's side must reflect some minimum portion of the projected light pattern to convey depth information (i.e., range data). For the measurement geometry in FIG. 3, the object 5 can be rotated 13 to adjust the angle 12 so that a surface 11 reflects more of the projected light pattern. Without feedback, it may be difficult to make this adjustment.

Feedback is necessary to quantify the quality of the depth map. The depth-map quality is typically determined by quantifying the number of null-data pixels in the depth map (i.e., null-data pixel-count). For example, the null-data pixel-count is the sum of the null-data pixels in a depth map.

The null-data pixel-count may determine the feedback type. If the null-data pixel-count is above a threshold count, then the processor may generate an error feedback. In another exemplary embodiment, if the ratio of the null-data pixel-count to the total number of pixels for a surface is higher than a threshold (e.g., 10%), then error feedback may be generated. Error feedback may indicate that the depth map is not suitable for dimensioning and could cause a measurement error or inaccuracy.

When the dimensioning system employs a time-of-flight sensor to generate three-dimensional data, the depth map is replaced with a distance map but the functionality is the same. Here each distance-map pixel may be assigned a confidence value. This confidence value may be averaged over the image or over a surface within the image. If the average confidence value over a prescribed area is below a threshold (e.g., 80%) then the processor may generate an error feedback. The error feedback may indicate that the distance map is not suitable for dimensioning and could cause a measurement error or inaccuracy.

Error feedback may include an indication that the handheld dimensioner cannot produce a dimension measurement under the current conditions. Error feedback may also include an indication that at least one object surface is not visible. In another embodiment, the error feedback may include an indication that the object color is too dark or that the lighting is insufficient. In some embodiments user-guidance feedback is provided in addition to (or instead of) error feedback whenever the threshold count is exceeded.

User-guidance feedback provides information to facilitate the adjustment of the measurement setup to improve the depth-map's quality. User-guidance feedback may indicate an adjustment to the measurement geometry (e.g., "rotate object" or "move dimensioner up"). User-guidance feedback may also specify an adjustment to the handheld-dimensioner's settings (e.g., "change shutter speed"). In another exemplary embodiment, the user-guidance feedback may include information to facilitate the adjustment of lighting.

After complying with the user-guidance feedback, a user may take another dimension measurement. A new depth map is then created, evaluated, and compared to the threshold count. This process could repeat until the depth map's null-data pixel count is at, or below, the threshold count. Alternatively, this repetition could end after some fixed number of trials.

If the depth map's null-data pixel-count is at or below the threshold count then the depth-map quality is suitable for dimensioning. The processor uses the depth map to compute a dimension measurement. A confidence feedback may also be generated.

Confidence feedback may include a visible image of the handheld-dimensioner's field-of-view and a wireframe rendering of the object created from range data. This confidence feedback is shown in FIG. 2. In this example, the wireframe rendering 15 matches the object 5, and in this way, helps provide confirmation that the dimensioning measurement is valid.

The confidence feedback could also include a confidence value. The confidence value could, for example, correspond to the percentage of null-data pixels (e.g., [100%−null-data-pixel %]=confidence %). Using this approach, a confidence value of 100% is a perfect depth map (i.e., with no null-data pixels), while a confidence value of 0% would represent the worst possible depth map.

In another embodiment, the confidence feedback indicates the dimension measurement's conformance to a standard. Industry standards promote healthy business and consumer climates by providing specifications to insure uniform and equitable measurements. Standards may require a particular measurement accuracy. The confidence feedback could indicate that a dimension measurement meets the requirements stipulated in one or more industry standards.

The feedback types describe so far (i.e., user-guidance feedback, error feedback, or confidence feedback) could each include indications embodied in a variety of forms. Audio or visible messages could convey the feedback. Audio feedback could include sounds or voice commands. Visible feedback could include illuminated indicators and/or graphics/text displayed on a screen.

Figure 4:
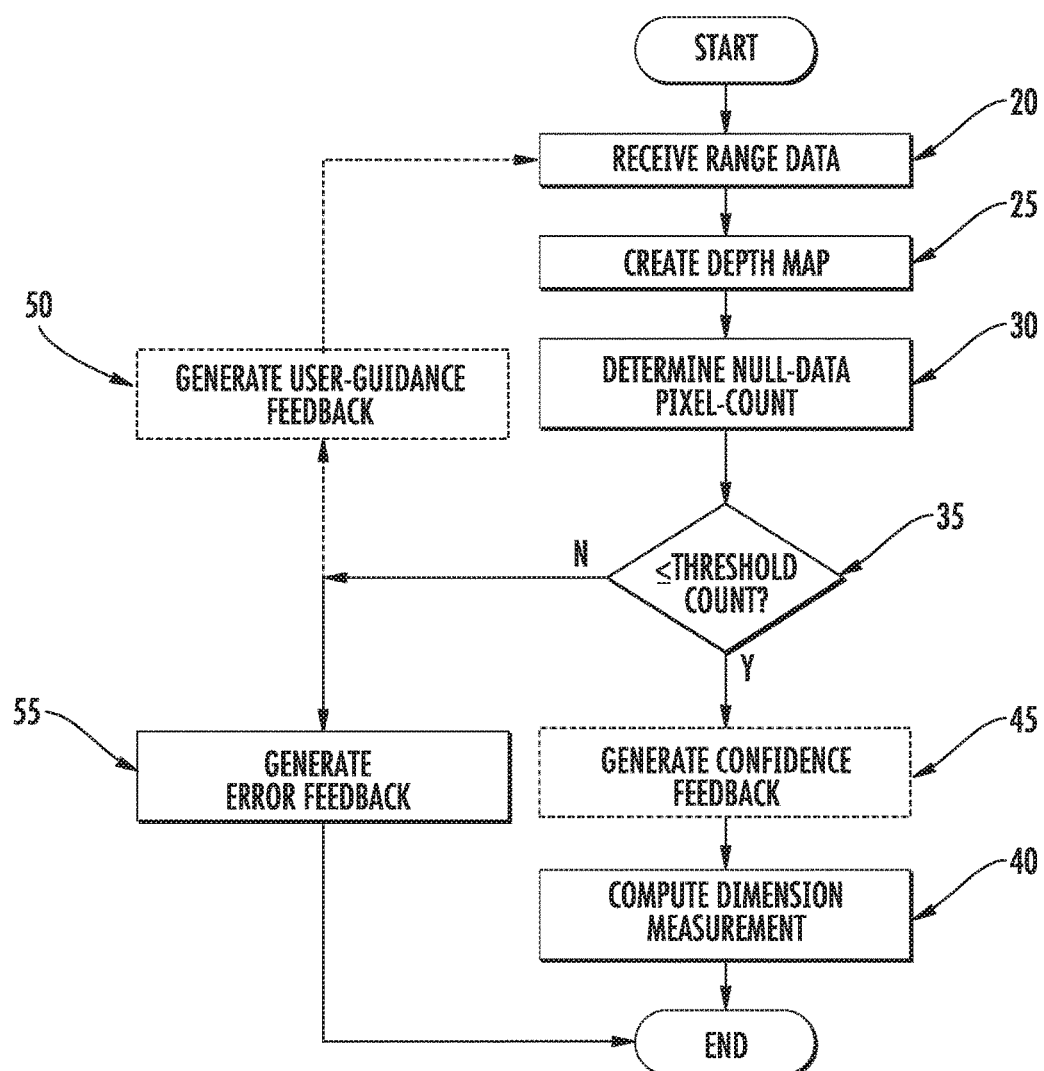
FIG. 4 schematically depicts a flowchart of an exemplary method for obtaining a dimension measurement using a handheld dimensioner.

FIG. 4 illustrates an exemplary a dimensioning measurement method including feedback based on a depth-map quality assessment. A handheld dimensioner is used obtain a dimension measurement. Range data is collected by a dimensioning subsystem that (in one possible embodiment) projects an infrared (IR) light pattern onto an object. The method begins with handheld dimensioner's processor receiving range data from the dimensioning subsystem 20. The processor then creates a depth map from the range data 25. This depth map may have null-data pixels. In the next step, the processor determines a null-data pixel-count 30 (i.e., summates the null-data pixels). The processor then compares the null-data pixel-count to a stored threshold count 35. This threshold count is based on a variety of factors that vary with application. The threshold count may be stored in the handheld dimensioner's memory and may be adjusted to meet the requirements associated with different applications.

If the null-data pixel-count is less than or equal to the threshold count, then the processor may compute a dimension measurement 40. In some embodiments, confidence feedback may be generated 45 and presented separately, or with, the dimension measurement.

If the null-data pixel count is greater than the threshold count, then the processor may (in some embodiments) use information derived from the depth map to generate user-guidance feedback 50. This user-guidance feedback facilitates the adjustment of the dimensioner, the environment, and/or the object for an improved range data acquisition. Acquiring range data, creating a depth map, and comparing the null-data in the depth map to a threshold count may repeat until a depth map with sufficient quality is obtained.

Error feedback may be generated 55 if the null-data pixel count is greater than the threshold count. This error feedback helps to alert the user that the data acquired is not suitable for a dimensioning measurement.

Figure 5:
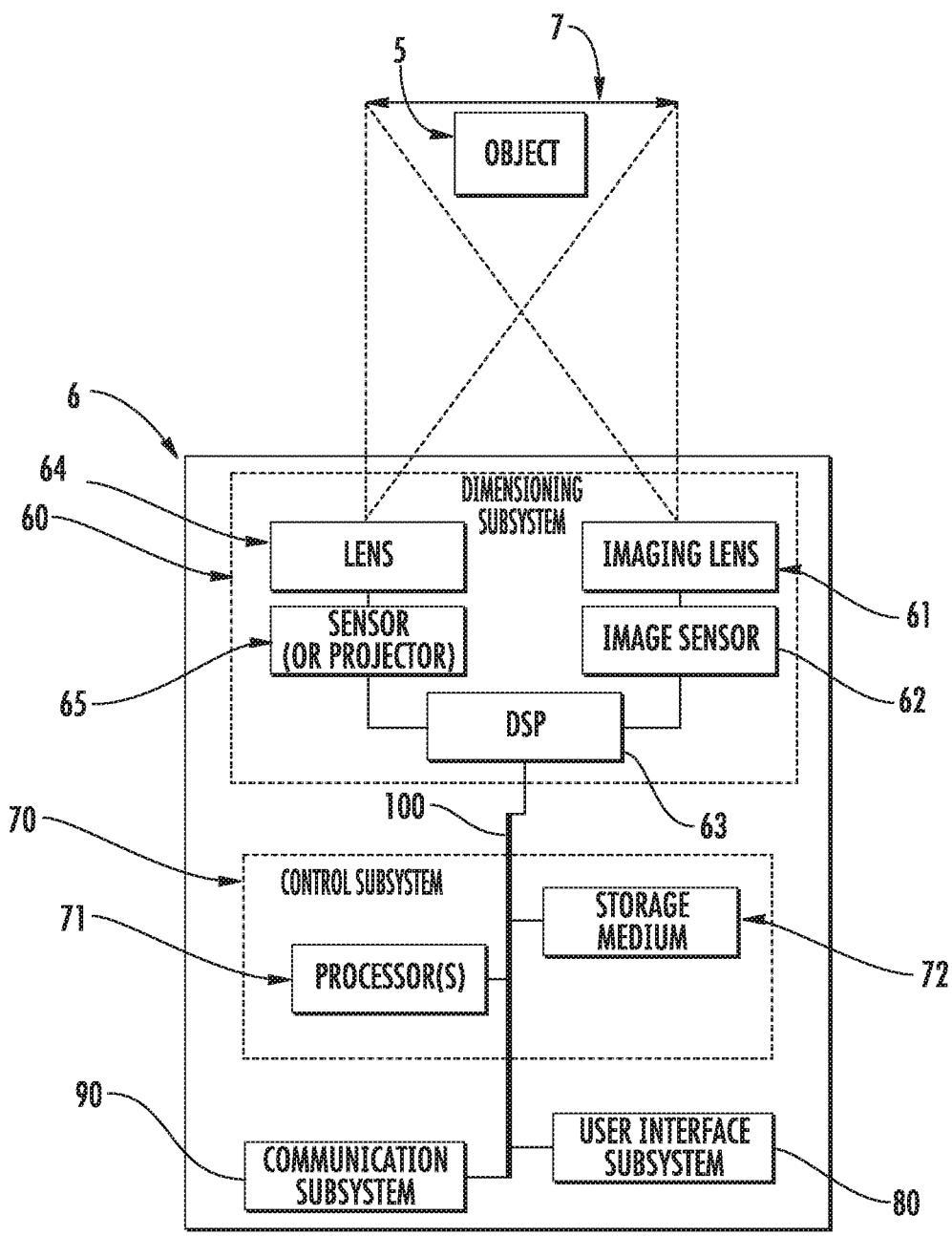
FIG. 5 schematically depicts an exemplary handheld dimensioning system configured to provide error feedback.

FIG. 5 schematically depicts a block diagram of an exemplary handheld dimensioning system configured to provide error feedback. An object 5 positioned in front of the dimensioning system 6 may have its dimensions (e.g., volume) measured optically. The dimensioner 6 utilizes a variety of subsystems to measure the object.

A dimensioning subsystem 6 uses at least one image sensor to capture range data of an object or objects within a field-of-view 7. To accomplish this, the dimensioning subsystem 60 uses an imaging lens 61 to focus a real image of the field-of-view 7 onto an image sensor 62 to convert the optical image into an electronic signal. The image sensor 62 may be a charge coupled device (i.e., CCD) or a sensor using complementary metal oxide semiconductor (i.e., CMOS) technology. The image sensor 62 typically includes a plurality of pixels that sample the real image and convert the real-image intensity into an electronic signal. A digital signal processor (i.e., DSP) 63 is typically included to facilitate the formation of the digital image.

The creation of range data (i.e., depth information) is facilitated by a second element in the dimensioning subsystem that either transmits an optical signal (i.e., projector) or images a scene (i.e., sensor). The lens 64 for the projector (or sensor) 65 is typically configured into a stereo arrangement with the imaging lens 61 to allow for the collection of depth information (e.g., using the principle of parallax). The projector (or sensor) 65 is typically communicatively coupled to the DSP 63 which may facilitate its control and communication.

A control subsystem 70 is communicatively coupled to the at least one image sensor (or the image sensor 61 and the projector 65) via the DSP 63. The control subsystem 70 includes one or more processors 71 (e.g., one or more controller, digital signal processor (DSP), application specific integrated circuit (ASIC), programmable gate array (PGA), and/or programmable logic controller (PLC)) to configure the imaging subsystem for the dimensioning data collection and to perform the processing to generate dimensioning measurements and feedback. The processor 71 may be configured by processor-executable instructions (e.g., a software program) stored in at least one non-transitory storage medium (i.e., memory) 72 (e.g., read-only memory (ROM), flash memory, and/or a hard-drive). The processor-executable instructions, when executed by the processor 71 configure the processor to: (i) receive range data from the dimensioning subsystem, (ii) create a depth map from the range data, (iii) process the depth map to obtain a depth-map quality, and (iv) generate an error feedback if the depth-map quality is below a minimum-quality threshold.

The dimensioning system 6 may also include a user-interface subsystem 80 to display dimension measurements (e.g., linear dimension or volume) and feedback. In some embodiments, the user-interface subsystem 80 may also facilitate the selection of objects and/or surfaces for dimensioning.

The dimensioner 6 may also include a communication subsystem 90 for transmitting and receiving information to/from a separate computing device or storage device. This communication subsystem 90 may be wired or wireless and may enable communication via a variety of protocols (e.g., IEEE 802.11, including WI-FI®, BLUETOOTH®, CDMA, TDMA, or GSM).

The subsystems in the dimensioner 6 are electrically connected via a couplers (e.g., wires or fibers) to form an interconnection subsystem 100. The interconnection system 100 may include power buses or lines, data buses, instruction buses, address buses, etc., which allow operation of the subsystems and interaction there between.

To supplement the present disclosure, this application incorporates entirely by reference the following commonly assigned patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;

U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Incicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Reublinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed 08-04-2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.) and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for obtaining a dimension measurement using a dimensioner, the method comprising:
   receiving range data from a dimensioning subsystem;
   creating a distance map from the range data;
   determining a null data pixel-count from the distance map, the null-data pixel-count comprising a sum total of null-data pixels; and
   computing a dimension measurement if the null-data pixel-count is at or below a threshold count, or generating an error feedback if the null-data pixel-count is above the threshold count;
   wherein each of the receiving, creating, determining, computing, and generating steps are performed using one or more processors.

2. The method according to claim 1, wherein the distance map comprises a digital image of the dimensioner's field-of-view, wherein the digital-image's pixel values correspond to the distance between the dimensioner and an object or objects in the field-of-view.

3. The method according to claim 2, wherein the distance map's null-data pixels comprise a single pixel value, the single pixel value indicating that a range measurement for a pixel was not possible.

4. The method according to claim 1, comprising generating a confidence feedback if the distance map's null-data pixel-count is below the threshold count.

5. The method according to claim 4, wherein the confidence feedback comprises a visible image of the dimensioner's field-of-view and a wireframe rendering of an object, the wireframe rendering displayed with the visible image.

6. The method according to claim 4, wherein the confidence feedback comprises an indication of a confidence value, the confidence value corresponding to the null-data pixel count.

7. The method according to claim 4, wherein the confidence feedback comprises an indication of the dimension measurement's conformance to a standard.

8. The method according to claim 1, comprising generating a user-guidance feedback if the null-data pixel-count is above the threshold count.

9. The method according to claim 8, wherein the user-guidance feedback comprises information to facilitate the adjustment of a measurement geometry.

10. The method according to claim 8, wherein the user-guidance feedback comprises information to facilitate the adjustment of lighting.

11. The method according to claim 8, comprising repeating the receiving, creating, determining, and generating until the distance map's null-data pixel-count is at or below the threshold count then computing a dimension measurement.

12. The method according to claim 1, wherein the error feedback comprises audio feedback.

13. The method according to claim 1, wherein the error feedback comprises illuminated indicators and/or graphics displayed by the dimensioner.

14. The method according to claim 1, wherein the error feedback comprises an indication that the object color is too dark or that the lighting is insufficient.

15. A dimensioning system configured to provide error feedback, the dimensioning system comprising:
   a dimensioning subsystem comprising at least one image sensor for capturing range data of an object or objects within a field-of-view; and
   a control subsystem communicatively coupled to the at least one image sensor, the control subsystem comprising at least one processor and at least one non-transitory storage medium for storing information and processor-executable instructions, wherein the processor-executable instructions configure the processor to:
   (i) receive range data from the dimensioning subsystem, (ii) create a distance map from the range data, (iii) process the distance map to obtain a distance-map quality, and (iv) generate an error feedback if the distance-map quality is below a minimum-quality threshold;
   wherein the distance-map quality comprises a sum of the number of pixels in the distance map having insufficient information to determine distance.

16. The dimensioning system according to claim 15, wherein the dimensioning subsystem comprises a pattern projector, the pattern projector projecting a light pattern on the object or objects in the field-of-view.

17. The dimensioning system according to claim 15, wherein the error feedback comprises user guidance information to facilitate the repositioning of the dimensioner to capture range data having an improved distance-map quality.

18. The dimensioning system according to claim 15, comprising a user-interface subsystem for displaying dimension measurements and the error feedback.

19. The dimensioning system according to claim 15, comprising a communication subsystem for transmitting and receiving information to/from a computing device and/or a storage device.

* * * * *